3,447,959
METHOD OF MAKING COATED ARC WELDING ELECTRODES
Lars Hilding Hillert, Goteborg, Sweden, assignor to Elektriska Svetsningsaktiebolaget, Goteborg, Sweden, a corporation of Sweden
No Drawing. Filed Sept. 7, 1965, Ser. No. 485,589
Claims priority, application Sweden, Sept. 7, 1964, 10,697/64
Int. Cl. B23k *35/36;* B32b *1/10*
U.S. Cl. 117—206        4 Claims

ABSTRACT OF THE DISCLOSURE

In the method of making coated arc welding electrodes involving the extrusion at a temperature not exceeding 100° C. of a pasty, preferably moistened compound of powdered constituents onto a massive or tubular wire or rod of iron or steel, the steps of incorporating with the coating compound a minor proportion of a compound selected from the group consisting of anhydrous boric oxide, boric acid, metaboric acid and tetraboric acid, and subjecting the coated electrodes to a temperature exceeding 450° C. but not sufficient to cause fusion of any coating constituents other than said selected compound, so that on evaporation of the water present, if any, the boric oxide fuses and on cooling provides a bond between the solid powder particles.

---

This invention relates to the manufacture of coated arc welding electrodes by the method in which a mixture of powdered constituents is extruded at normal temperatures about a wire or rod of iron or steel. The wire or rod is usually massive, but it may also consist of a tube or sheath enclosing a filling or core of powdered constituents such as powdered metals or alloys, fluxing agents, arc stabilizing agents etc. The term "normal temperatures" in this context is meant to include any temperature from room temperature up to 100° C.

In a well known and universally adapted process of this kind the powdered coating constituents are mixed with potassium or sodium silicate solution prior to the extrusion. After the extrusion the electrodes are submitted to a drying process, usually at elevated temperatures. The alkali metal silicate is an excellent bonding agent, but has the sometimes serious disadvantage of imparting to the coating a tendency to absorb humidity out of the atmosphere. Moreover, the silicon content of the alkali metal silicate is metallurgically undesirable in some kinds of electrodes, as some elementary silicon may be reduced out of the slag and enter the weld metal. The alkali content of the alkali silicate may also be undesirable, for instance when it is desired to keep the content of electron emitting agents of the coating down to a minimum.

In a method described in the British patent specification No. 713,381 the powdered coating constituents are mixed with a powdered, low melting, hydrophobic, water-insoluble glass frit. The mixture is made into a paste by the addition of water and extruded onto wire cores in the usual way. After drying, the electrodes are fired at a temperature sufficient to soften the glass frit and cause it to wet and adhere to the particles of the other flux ingredients. The glass frits thus used as bonding agents are each composed of nine or ten fused oxides and fluorides, which may include boric oxide in proportions up to 40 mol percent of the fused frit. The required firing temperatures for the electrode coating are stated to be in the range between 570 and 680° C.; preferably a temperature of 590–650° C. is used. The glass frit preferably constitutes about 15 to 25 percent of the weight of the coating. The method has found no practical use, probably on account of the high firing temperature required and the undesirably high proportion of bonding agent required.

The invention has for its principal object to provide a method in which the disadvantages of the existing methods referred to are avoided. The invention is mainly distinguished thereby that the coating compound is made to include a minor proportion of boric oxide ($B_2O_3$), if desired in the form of boric acid $H_3BO_3$ or metaboric acid $HBO_2$ or tetraboric acid $H_2B_4O_7$, and that the coated electrodes are heated to a temperature exceeding 450° C., so that on evaporation of the water present, if any, the boric oxide fuses and on cooling forms a bond between the solid powder particles. The temperature to which the electrodes are heated is suitably chosen in the range between 450 and 550° C. and must in no case exceed 600° C. Preferably a temperature of about 500° C. is employed.

In the method according to the invention it is possible to do entirely without alkali metal silicate in the coating composition. The invention includes, however, the possibility of using alkali metal silicate in addition to the boric oxide or boric acid. The proportion of alkali metal silicate (dry weight) should in that case preferably not exceed the proportion of boric oxide in the coating. In spite of the presence of the alkali silicate, a substantial reduction of the absorptivity of the coating is obtained. A probable explanation is that the boric acid on fusing effects a sealing of the fine pores of the coating, resulting in a supression of the absorption of humidity.

In order to render the powdered coating composition sufficiently plastic for the extrusion, it is preferably mixed in the usual way with water (or, if desired, an alkali metal silicate solution). If required, the composition may contain usual plasticizing agents such as China clay, bentonite, precipitated titania, cellulose ester or alginate. The invention also includes the possibility of extruding a water-free coating compound, which may for instance contain a proportion of paraffin wax or other waxy plasticizers capable of being completely vaporized by heating to a temperature not exceeding 450° C.

The proportions of boric oxide or boric acid in the coating composition should be chosen with due regard to the grain size distribution in said composition as well as to the properties required of the slag. In coatings containing no alkali metal silicate, a minimum content of 3% of $B_2O_3$ (corresponding to 5% of $H_3BO_3$) will generally be required in order to obtain a coating of sufficient mechanical strength. Under special conditions, a satisfactory bond can be obtained with an addition of only about 1% of $B_2O_3$. The practical upper limit to the $B_2O_3$ content of the coating is about 10%, as larger contents provide no further increase of the strength of the coating or other advantages and also tend to reduce the fusion temperature of the slag too much.

*Example.*—The following powdered constituents are mixed in the dry state:

| | Percent |
|---|---|
| Limestone | 26 |
| Fluorspar | 21 |
| Rutile | 5 |
| Bentonite | 3 |
| Iron powder | 32 |
| Ferrosilicon | 6 |
| Ferromanganese | 1.5 |
| Cellulose ester | 0.5 |
| Boric acid ($H_3BO_3$) | 5 |
| | 100 |

The mixture is made into a stiff paste by the addition of some water. The paste is extruded onto mild steel core wires of 3.25 mm. diameter in an electrode press, the diameter of the extrusion nozzle being 5.2 mm. The electrodes are left to dry 24 hours at room temperature and are then heated to 475° C. in a furnace. When said temperature has been reached, heating of the furnace is turned off and the electrodes are allowed to remain in the furance until the furnace temperature has dropped to about 100° C.

The invention may also be applied to the manufacture of long wire electrodes for automatic welding supplied in the form of coils. Such electrodes may, for instance, have a coating of the wire-sheathed type (that is, with one or more wires flyspun around a core wire, the spaces being filled with flux). It is also possible to apply the invention to the manufacture of electrodes the coating of which consists of two or more portions having dissimilar compositions, for instance electrodes having a coating comprising two concentric layers, at least one of which is made by the method according to the invention. Both layers may be extruded simultaneously, as known per se.

I claim:

1. In the method of making coated arc welding electrodes by the extrusion at a temperature not exceeding 100° C. of a pasty, preferably moistened compound of powdered constituents onto a massive or tubular wire or rod of iron or steel, the steps of incorporating with the coating compound a minor proportion of a compound selected from the group consisting of anhydrous boric oxide, boric acid, metaboric acid and tetraboric acid, and subjecting the coated electrodes to a temperature exceeding 450° C. but not sufficient to cause fusion of any coating constituents other than said selected compound, so that on evaporation of the water present, if any, the boric oxide fuses and on cooling provides a bond between the solid powder particles.

2. A method as claimed in claim 1 in which the coated electrodes are heated to a tempearture of about 500° C. but not exceeding 550° C.

3. A method as claimed in claim 1 for the manufacture of electrodes containing no other bonding agent than boric oxide, in which the coating compound is made to contain at least about 3% of boric oxide.

4. A method as claimed in claim 1 for the manufacture of electrodes containing no other bonding agent than boric acid, in which the coating compound contains at least about 5% boric acid.

References Cited
UNITED STATES PATENTS

| 1,872,320 | 8/1932 | Mino et al. | 117—202 |
| 2,118,680 | 5/1938 | Lytle | 117—202 |

WILLIAM L. JARVIS, *Primary Examiner.*

U.S. Cl. X.R.

117—202, 207; 148—126; 219—146; 264—174